L. DINESEN.
PULSATING DEVICE FOR MILKING APPARATUS.
APPLICATION FILED OCT. 10, 1913.

1,117,169.

Patented Nov. 17, 1914.

3 SHEETS—SHEET 1.

Witnesses
A. H. Opsahl
E. C. Skinkle

Inventor
Laurits Dinesen
By his Attorneys
Williamson Merchant

L. DINESEN.
PULSATING DEVICE FOR MILKING APPARATUS.
APPLICATION FILED OCT. 10, 1913.
1,117,169.
Patented Nov. 17, 1914.
3 SHEETS—SHEET 2.
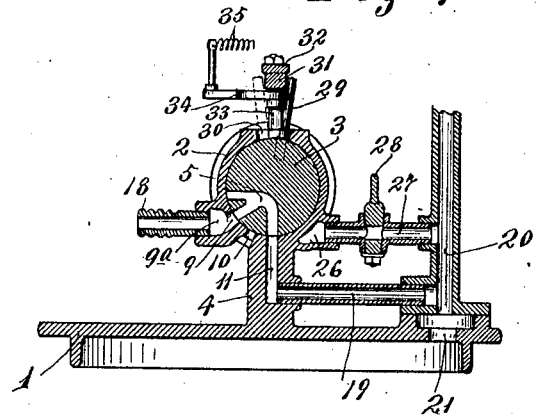
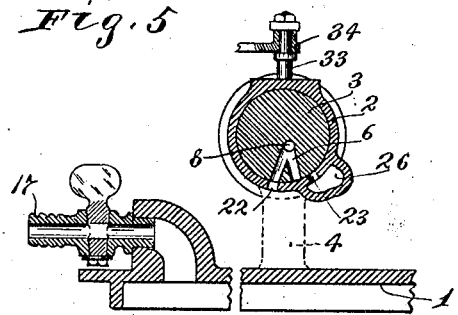
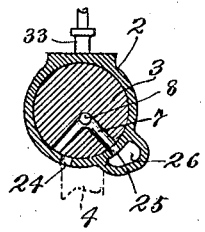
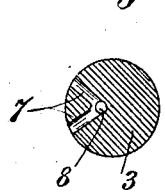
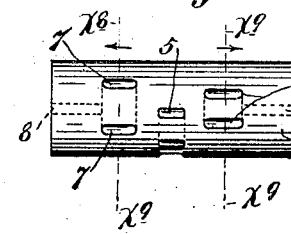
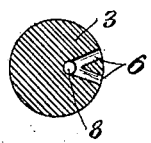
Witnesses.
A. H. Opsahl.
E. C. Skinkle
Inventor.
Laurits Dinesen
By his Attorneys
Williamson & Merchant

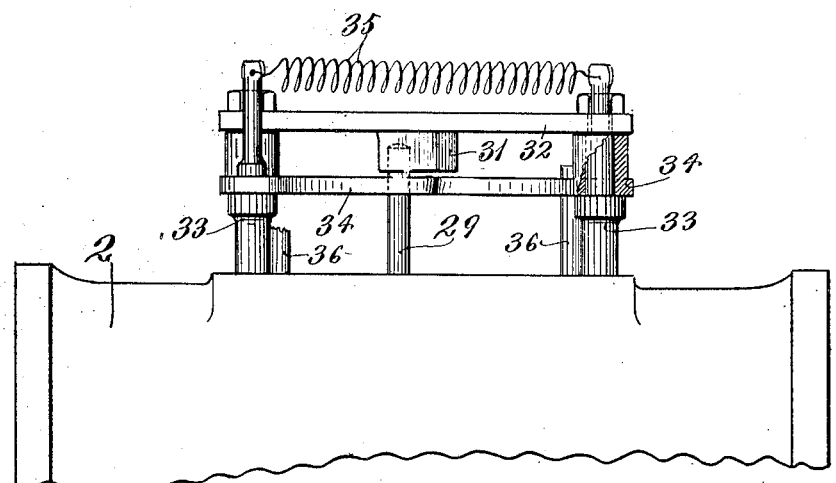
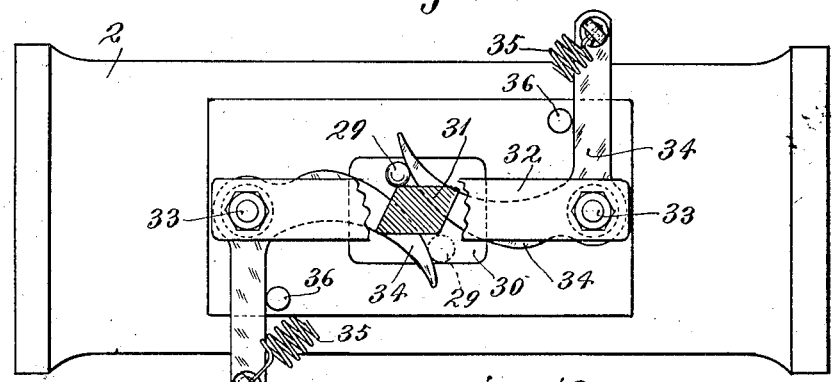
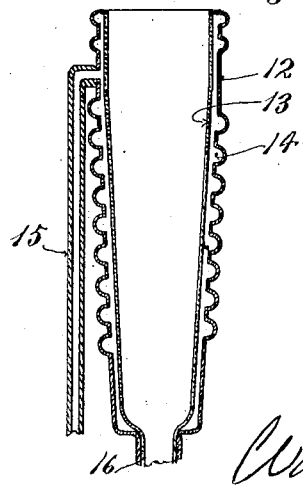

UNITED STATES PATENT OFFICE.

LAURITS DINESEN, OF MINNEAPOLIS, MINNESOTA.

PULSATING DEVICE FOR MILKING APPARATUS.

1,117,169.   Specification of Letters Patent.   Patented Nov. 17, 1914.

Application filed October 10, 1913. Serial No. 794,439.

*To all whom it may concern:*

Be it known that I, LAURITS DINESEN, citizen of the United States, residing at Minneapolis, in the county of Hennepin and State of Minnesota, have invented certain new and useful Improvements in Pulsating Devices for Milking Apparatus; and I do hereby declare the following to be a full, clear, and exact description of the invention, such as will enable others skilled in the art to which it appertains to make and use the same.

My invention relates to milking apparatus and is directed particularly to the improved mechanism for producing pulsations required in the milking action.

Generally stated, the invention consists of the novel devices and combinations of devices hereinafter described and defined in the claims.

In the accompanying drawings which illustrate the invention, like characters indicate like parts throughout the several views.

Figure 1:
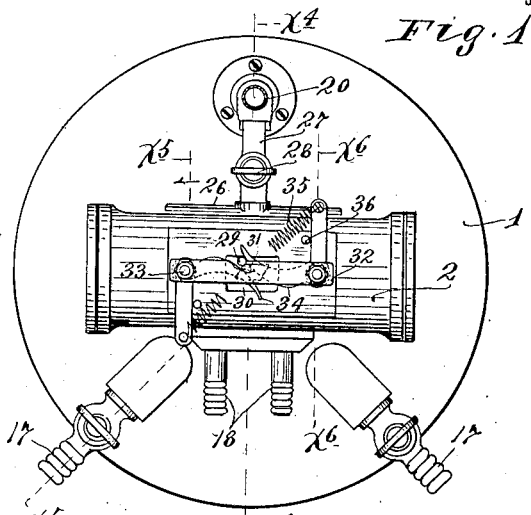
Figure 2:
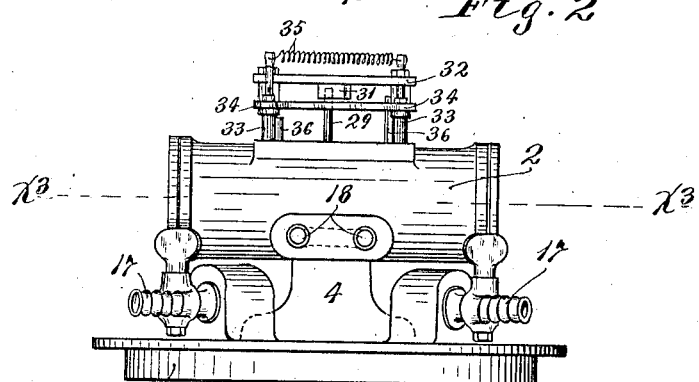
Figure 3:
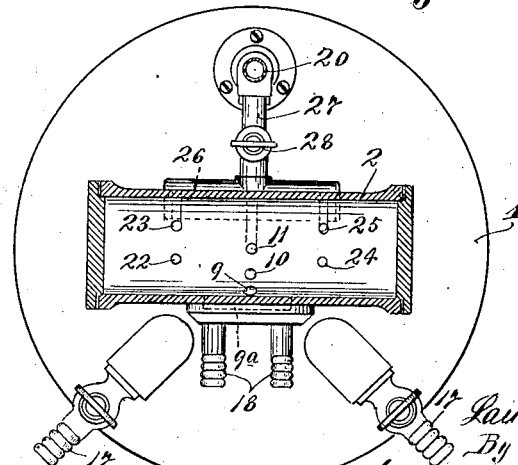

Referring to the drawings: Figure 1 is a plan view showing the pulsating mechanism; Fig. 2 is a side elevation of the same with some parts broken away; Fig. 3 is a horizontal section taken on the line $x^3$ $x^3$ on Fig. 2; Fig. 4 is a transverse vertical section taken on the line $x^4$ $x^4$ on Fig. 1; Fig. 5 is a section taken on the irregular line $x^5$ $x^5$ on Fig. 1, some parts being broken away; Fig. 6 is a fragmentary section taken on the irregular line $x^6$ $x^6$ on Fig. 1; Fig. 7 is a plan view of the piston of the pulsator removed from the cylinder thereof; Fig. 8 is a section taken on the line $x^8$ $x^8$ on Fig. 7; Fig. 9 is a section taken on the line $x^9$ $x^9$ on Fig. 7; Fig. 10 is an enlarged plan view showing the cylinder and certain coöperating parts of the pulsator, some parts being broken away; Fig. 11 is a side elevation of the parts shown in Fig. 10, some parts being broken away; and Fig. 12 is a sectional view of one of the teat cups.

My improved pulsator mechanism comprises a cylinder and piston which are preferably supported directly on a base that serves as a cover to a milk pail and will be applied to the pail with an air tight joint. It may be here also stated that this improved pulsator is especially adapted for use in connection with teat cups of the type disclosed in my prior Patent No. 1,072,584, of date, September 9th, 1913, entitled "Milking apparatus."

In the construction illustrated, the numeral 1 indicates a base which, as indicated, is adapted to serve as the cover of a milk pail.

The numeral 2 indicates the cylinder and the numeral 3 the piston of the pulsator proper. This cylinder 2, as shown, is cast integral with a supporting pedestal 4 which, in turn, is cast integral with the cover or base 1. The piston 3 is arranged to vibrate and to oscillate within the cylinder and it is provided with an intermediate three-branch port 5 and with V-shaped ports 6 and 7 located on opposite sides of the said port 5. The ports 6 and 7 have conduits 8 that lead therefrom and are open at the ends of the piston. The cylinder 2 is formed with three centrally located circumferentially spaced ports 9, 10 and 11, all of which coöperate with the centrally located or intermediate three-branch port 5 of the piston.

Attention is now directed to the teat cup shown in Fig. 12. This teat cup comprises a tubular metallic outer casing 12 and an inner lining 13, preferably of rubber, and which is spaced from the shell 12, so as to leave an intervening air space 14. An air tube 15 is attached to the outer casing 12 and communicates with the air chamber 14. The lower end of the casing 12 has a depending tube 16 which communicates with the interior of the teat cup. The cow's teat is placed within the said teat cup so that it is directly subject to suction produced in the tube 16. This teat cup is illustrated simply for the purpose of illustrating the action of the improved pulsator. The cover or base 1 is provided with valve-equipped nipples 17, which, by suitable tubes not shown, will be connected to the tube 16 of the teat cup, so that milk drawn by suction produced in the pail will be drawn from the said teat cup into the said pail. The cylinder ports 9, above described, are, as shown, constantly connected to a pair of nipples 18 through a small chamber 9ª formed in the cylinder casting. The cylinder port 10 opens to the atmosphere while the port 11 is connected by a conduit 19 to an air suction tube 20, the lower end of which, as shown, is rigidly secured to the base 1 and is in constant connection with the interior of the pail on which the base is applied, through a port 21 in the said base. In addition to the centrally located ports 9, 10 and 11, the cylinder is provided on one side thereof with circumferentially spaced ports 22 and 23, and on the other side thereof, with similar ports 24 and 25. The ports 22 and 24 open to the atmosphere while the ports 23 and 25 are connected through a small conduit 26 formed in the cylinder casting. This conduit 26 is connected by a tube 27 to the air suction pipe 20, and is preferably provided with a normally opened valve 28. The air suction pipe 20 will be connected through other pipes, not shown, to a vacuum pump or other means for producing partial vacuum or negative pressure.

At its central portion, the piston 3 is provided with an upwardly projecting cam pin 29 that works through a large clearance passage 30 formed in the top of the cylinder casting. This cam pin 29 engages with and is adapted to work completely around a cam block 31 secured to an overlying supporting bar 32, which, in turn, is supported from the cylinder casting at its ends by suitable studs or posts 33. The opposite ends of the cam block 31 are beveled, as best shown in Fig. 10. Reversely arranged, yieldingly held shipper cams 34 are pivoted on the studs 33, and as shown, are provided with projecting arms that are yieldingly connected by a coiled spring 35. Stop pins 36 on the cylinder casting limit the movements of the cams 34 toward each other, to positions shown in Figs. 1 and 10.

Operation: The operation of this improved pulsator is substantially as follows: When the apparatus is in operation, there will be a constant suction or partial vacuum in the milk pail, and hence, in the teat receiving chamber formed within the flexible lining 13 of the teat cup, so that there is a constant tendency to draw the milk from the teat into the pail. The pulsations which are produced by the improved mechanism, as presently described, causes the flexible lining 13 to intermittently contract and compress the teat and then to expand and release the squeezing pressure on the teat. Obviously, the constant suction within the flexible lining 13 will contract the lining against the teat when atmospheric pressure is permitted within the chamber 14, and on the other hand, whenever partial vacuum is produced with the said chamber 14, the said flexible lining will be expanded or drawn outward and thereby relieve the pressure on the teat. These alternating pulsations produce a very natural milking action. We will now follow the operation of the apparatus for producing these pulsations. In the first place, it should be noted that the endwise movements of the piston 3 within the cylinder 2 are sufficient to carry the centrally located three-branch ports 5 from one side to the other of the circumferential line of the centrally located cylinder ports 9, 10 and 11, while the ports 6 and 7, being approximately as long as the movement of the piston, never move endwise to positions in which the said ports 6 cannot operate with the ports 22 and 23, or in which the said ports 7 cannot operate with the cylinder ports 24 and 25. Assume to start with, that the piston is at the left hand end of the cylinder, ready to commence its movement toward the right, in which case, its cam pin 29 will be in the position shown in Fig. 10. In this position of the piston, the valve port 6 is out of registration with the suction port 23 but is in communication with the atmospheric air port 22, so that atmospheric pressure is then effective in the left hand end of the cylinder. At this time, the other cylinder port 7 is out of registration with the atmospheric air port 24 and is in registration with the suction port 25, so that the right hand end of the cylinder is then subject to partial vacuum which causes the piston to move toward the right. During the greater part of the movement of the piston from the left toward the right, the three-branch port 5 of the piston will be in the position shown in Fig. 4, in which position the nipple 18, and, consequently, the chamber 14 of the teat cup, will be subject to suction or partial vacuum. As the piston moves toward the right, it engages and presses outward the yieldingly held right hand cam 34, until its cam pin 29 passes beyond the right hand end of the cam block 31, whereupon the said yielding right hand cam 34 acts on the pin 29, quickly throws the said cam pin to the opposite side of the cam block, thereby oscillating the piston within the cylinder. This oscillation of the piston completely reverses the relative arrangement of the coöperating ports, to-wit, it moves the right hand piston port 7 out of registration with the suction port 25 and into registration with the air port 24, and moves the left hand piston port 6 out of registration with the air port 22 and into registration with the air port 23. This, as is evident, admits atmospheric pressure into the right hand end of the cylinder and causes the left hand end of the cylinder to be subject to partial vacuum so that the piston will then be drawn toward the left. Under movement of the piston from right toward the left, the three-branch intermediate port 5 of the piston will be out of registration with the suction port 11, but will be in position to connect the atmospheric air port 10 with the cylinder port 9, and thus admit atmospheric pressure into the chamber 14 of the teat cups. At the limit of the movement of the piston toward the left, the left end cam 34 flips the cam pin 29 back to the position shown in Fig. 10 and thereby sets the valves of the piston in the position in which they were when the description of this operation was begun. The parallel walls of the slot 30 in the top of the cylinder casting, positively limit the extreme oscillatory movement of the stop pin 29, and hence, the rotary movements of the piston.

From the foregoing description, it is evident that when partial vacuum is produced in the so-called suction tube 20, the piston of the pulsator will be automatically reciprocated and will automatically control the pulsations produced in the teat cups. In actual practice, this improved pulsating mechanism has been found highly efficient for the purposes had in view.

What I claim is:

1. A pulsator comprising a cylinder and a piston having coöperating ports and means for reciprocating said piston and for oscillating the same at the limits of the piston's reciprocating movements, a suction pipe connected to certain of the cylinder ports, and certain other cylinder ports being arranged for connection to a teat cup.

2. A pulsator comprising a cylinder and piston having coöperating ports, a suction pipe connected to certain of the cylinder ports, certain of the cylinder ports being open to the atmosphere and certain other cylinder ports being arranged for connection to a teat cup, and means for oscillating said piston at the limit of its reciprocating movements, the said ports and oscillations of said piston coöperating to control reciprocations of said piston.

3. A pulsator comprising a cylinder and piston having coöperating ports, a suction pipe connected to certain of the cylinder ports, certain of the cylinder ports being open to the atmosphere and certain other cylinder ports being arranged for connection to a teat cup, the said ports coöperating to produce reciprocations of said piston, means for oscillating said piston at the limit of its reciprocating movements, a pail cover affording a base upon which said cylinder and suction tube are mounted, and the latter having a port that opens through said cover.

4. A pulsating device comprising a cylinder and piston, said cylinder and piston having coöperating ports, said piston having a projecting cam pin working through an opening in said cylinder, and a cam block around which the said cam pin is arranged to work to cause oscillations of the piston when it is reciprocated, the said ports and oscillations of said piston coöperating to control reciprocations of said piston.

5. A pulsating device comprising a cylinder and piston, said cylinder and piston having coöperating ports, said piston having a projecting cam pin working through an opening in said cylinder, a cam block around which the said cam pin is arranged to work to cause oscillations of the piston when it is reciprocated, and yielding cams operative on said cam pin to insure the oscillatory movements of said piston at the limit of the reciprocatory movements thereof, the said ports and oscillations of said piston coöperating to control reciprocations of said piston.

6. In a pulsating device, the combination with a pail cover affording a base, and a cylinder and suction pipe supported on said base, said suction pipe being in constant communication with a port that opens through said base, said cylinder having three circumferentially spaced intermediate ports and a pair of end ports on each side thereof, one of the intermediate ports of said cylinder being in communication with teat cup connections, another thereof being open to the atmosphere, and the other thereof being connected to the said suction pipe, one of each pair of end ports of said cylinder being open to the atmosphere, and the other end ports being connected to said suction pipe, and the said base having milk supply conduits adapted for connection to teat cups, a piston working within said cylinder and provided with a three branch intermediate port and with end ports, the end ports of said piston being longitudinally extended so that they are not moved out of longitudinal line with the end ports of said cylinder and being arranged to alternately connect the opposite ends of said cylinder to the atmosphere and to said suction tube, whereby said piston is automatically reciprocated, and means for oscillating said piston at the limit of reciprocatory movements thereof.

7. In a pulsating device, the combination with a pail cover affording a base, and a cylinder and suction pipe supported on said base, said suction pipe being in constant communication with a port that opens through said base, said cylinder having three circumferentially spaced intermediate ports and a pair of end ports on each side thereof, one of the intermediate ports of said cylinder being in communication with teat cup connections, another thereof being open to the atmosphere, and the other thereof being connected to the said suction pipe, one of each pair of end ports of said cylinder being open to the atmosphere, and the other end ports being connected to said suction pipe, and the said base having milk supply conduits adapted for connection to teat cups, a piston working within said cylinder and provided with a three branch intermediate port and with end ports, the end ports of said piston being longitudinally extended so that they are not moved out of longitudinal line with the end ports of said cylinder and being arranged to alternately connect the opposite ends of said cylinder to the atmosphere and to said suction tube, whereby said piston is automatically reciprocated, and means for oscillating said piston at the limit of reciprocatory movements thereof, said means comprising a cam pin on said piston working through an opening in said cylinder, a fixed cam block around which said cam pin travels, and yielding cams operative on said pin to shift the same from one side to the other of said cam block at the limit of the reciprocatory movements of said piston.

In testimony whereof I affix my signature in presence of two witnesses.

LAURITS DINESEN.

Witnesses:
F. D. MERCHANT,
HARRY D. KILGORE.